United States Patent [19]

Schäfer

[11] Patent Number: 4,558,773
[45] Date of Patent: Dec. 17, 1985

[54] VIBRATION DAMPING CLUTCH DISC

[75] Inventor: Georg Schäfer, Weinheim, Fed. Rep. of Germany

[73] Assignee: Firma Carl Freudenberg, Weinheim, Fed. Rep. of Germany

[21] Appl. No.: 206,009

[22] Filed: Nov. 12, 1980

[30] Foreign Application Priority Data

Feb. 6, 1980 [DE] Fed. Rep. of Germany ....... 3004242

[51] Int. Cl.$^4$ .............................................. F16D 3/68
[52] U.S. Cl. ............................. 192/106.1; 192/70.17; 464/90
[58] Field of Search .................... 192/106.1, 70.17, 55, 192/30 V; 64/27 NM, 13; 464/90, 91, 99

[56] References Cited

U.S. PATENT DOCUMENTS

| 1,896,968 | 2/1933 | Paton | 192/70.17 |
|---|---|---|---|
| 2,234,443 | 3/1941 | Macbeth | 192/106.1 |
| 3,232,077 | 2/1966 | Binder | 464/90 |
| 3,245,229 | 4/1966 | Fädler | 464/90 |
| 3,557,573 | 1/1971 | Hansgen | 192/106.1 X |

FOREIGN PATENT DOCUMENTS

| 1259150 | 1/1968 | Fed. Rep. of Germany | 464/90 |
|---|---|---|---|
| 1425297 | 10/1968 | Fed. Rep. of Germany | 464/90 |
| 2024368 | 1/1980 | United Kingdom | 464/90 |

Primary Examiner—Rodney H. Bonck
Attorney, Agent, or Firm—Kenyon & Kenyon

[57] ABSTRACT

A vibration-damping clutch disc with a hub from which a drive disc extends. Support rings on opposite sides of the drive disc are joined together by connections that pass through cutouts in the drive disc and are capable of transmitting torque. Intermediate rings are located between a central hub and each of the support rings and are joined to the hub by radially inner elastomeric damper rings. The intermediate rings have flanges joined by connections that also pass through cutouts in the drive ring. Radially outer elastomeric damper rings join the flange of each intermediate ring to the respective support ring, and one of the support rings has an outer flange with a friction ring on it to be pressed against a flywheel.

2 Claims, 2 Drawing Figures

VIBRATION DAMPING CLUTCH DISC

BACKGROUND OF THE INVENTION

1. Field of the Invention

This invention relates to clutch discs having vibration damping means and particularly to clutch discs having a drive disc attached to a hub with intermediate rings and support rings on each side of the drive disc and with damping rings between the hub and each intermediate ring and between each intermediate ring and the respective support ring to provide a structure in which the damping rings may be properly pre-stressed.

2. The Prior Art

German OS No. 14 25 260 describes a vibration damping clutch disc suitable for a motor vehicle and including a hub with a drive disc, damper rings of elastomeric material connected to the hub on each side of the drive disc and vulcanized to the generally cylindrical inner surfaces of intermediate rings, and additional damping rings vulcanized directly to the outer surfaces of the respective intermediate rings and connected to outer support rings, respectively. The support rings are connected to each other and to a friction disc by a connecting element, and the connecting element, as well as bosses of the intermediate rings, face each other in the axial direction and engage in cutouts of the drive disc. The intermediate rings have several projections distributed over their respective circumferences, and these projections, in conjunction with stops of the drive disc associated with these projections, limit the relative twisting mobility of the structure.

The stability of the relationship of the intermediate rings and the hubs of the structure just described is very low. From different degrees of loading of the individual stops, which can result from insufficient mutual matching of the dimensional tolerances of the parts, radial displacement of the intermediate rings and, therefore, of the friction disc from the axis of rotation can occur. Such radial displacement is extremely undesirable, and in order to reduce it, elastic pre-tension of the damper rings by a mutual connection of the support rings was proposed. The magnitude of this pre-tension is the same in all damper rings but specifically only if the receiving cross-sections are identical. The radially inner damper rings, therefore, have a greatly enlarged cross-section, which increases the weight of the clutch disc, and is therefore undesirable. The same feature also results in a relatively steep slope of the spring characteristic when small torques are transmitted, and this feature is also undesirable.

The purpose of vibration-damping is to isolate vibrations generated by the engine when it is idling or when it is transmitting small torques, and to damp vibrations generated when nominal torque is transmitted. Starting shocks and other overloads are also to be intercepted.

For the lower torque range, a flat spring characteristic is required, which is not necessary in the upper torque range In addition to the disadvantages discussed hereinabove, the prior clutch disc does not satisfactorily fulfill this basic requirement.

OBJECTS AND SUMMARY OF THE INVENTION

It is an object of the invention to develop a vibration-damping clutch disc which has a particularly flat spring characteristic in the lower torque range and a steep slope in the region of the nominal torque.

Another object is to provide a clutch disc that has the foregoing characteristics and is easily producible and in which customary manufacturing tolerances can be easily maintained.

A further object is to provide such a clutch disc having particularly great stability with respect to the positional relationship of the intermediate rings and the support rings relative to the hub for all degrees of loading.

According to the invention, these objects are achieved by a clutch disc that includes intermediate rings having an angular profile with flange means extending radially outwardly and rigid connections between those rings. The disc also has support rings with circular projections that extend substantially inwardly, with outer, elastomeric damper rings between the outwardly extending flange means of the intermediate rings and the inwardly extending projections of the support rings.

The damper rings are arranged concentrically in generally the same radial plane, the inner damper ring being of bushing-like design, while the outer damper ring has a V-shaped profile. Elastic pre-stress in the inner damper rings is achieved by the connection between the intermediate rings, and elastic pre-stress in the outer rings is achieved by connection between the support ring. Such arrangement permits the specific pre-stresses to be adjusted to optimum values, and due to the rigid connection between the opposite intermediate rings, excellent mutual stabilization is obtained with respect to the positional relationship and with respect to the vibration behavior.

The intermediate rings, as well as the support rings, can be connected to each other by threaded bolts. However, it has been found to be more economical to use rivets to connect each pair of rings, with spacer sleeves being arranged on the rivets between the rings in the axial direction. The spacer sleeves may have a surface coating of rubber or another elastic material in order to reduce the noise when the end stops of the drive disc are struck. The thickness of the layer of such a coating is such that the forces introduced into the individual rivets are equalized.

The central region of the rivets can also be made with a larger diameter so that the intermediate rings and the support rings rest directly on the shoulders formed thereby. This has the advantage of stabilizing the adjoining parts so that the latter can be made of deep-drawn sheet steel with a relatively small wall thickness of about 1 to 2 mm. It is to be understood that the mutual spacings between the individual rivets in the circumferential directions must not be too large, preferably not in excess of 100 mm, and it must be ensured that the distances between rivets are uniformly large. Connecting pairs of rings by means of four rivets is preferred.

The positional relation of the intermediate rings can be such that the distance of the centers of the bolts or rivets from the axis of the clutch disc is substantially identical with the distance of the center of gravity of the intermediate rings from the axis. This results in advantageous static and dynamic stabilization of the intermediate rings and, therefore, of the entire clutch disc.

The support rings can be held on the drive disc by a circumferentially movable sliding guide, which ensures a particularly high-quality relationship of the friction disc relative to the hub. The sliding guide can be arranged in the vicinity of the outside circumference of the drive disc as well as in the vicinity of the cutouts. In addition, the connections between the support rings can be included in the sliding guide. The proposed arrangement of the intermediate rings further ensures a high-grade rotational symmetry under all operating conditions in conjunction with the relationship and configuration of the damper rings whereby engagement of the sliding guide is expected only in extreme cases.

DETAILED DESCRIPTION OF THE INVENTION

Figure 1:
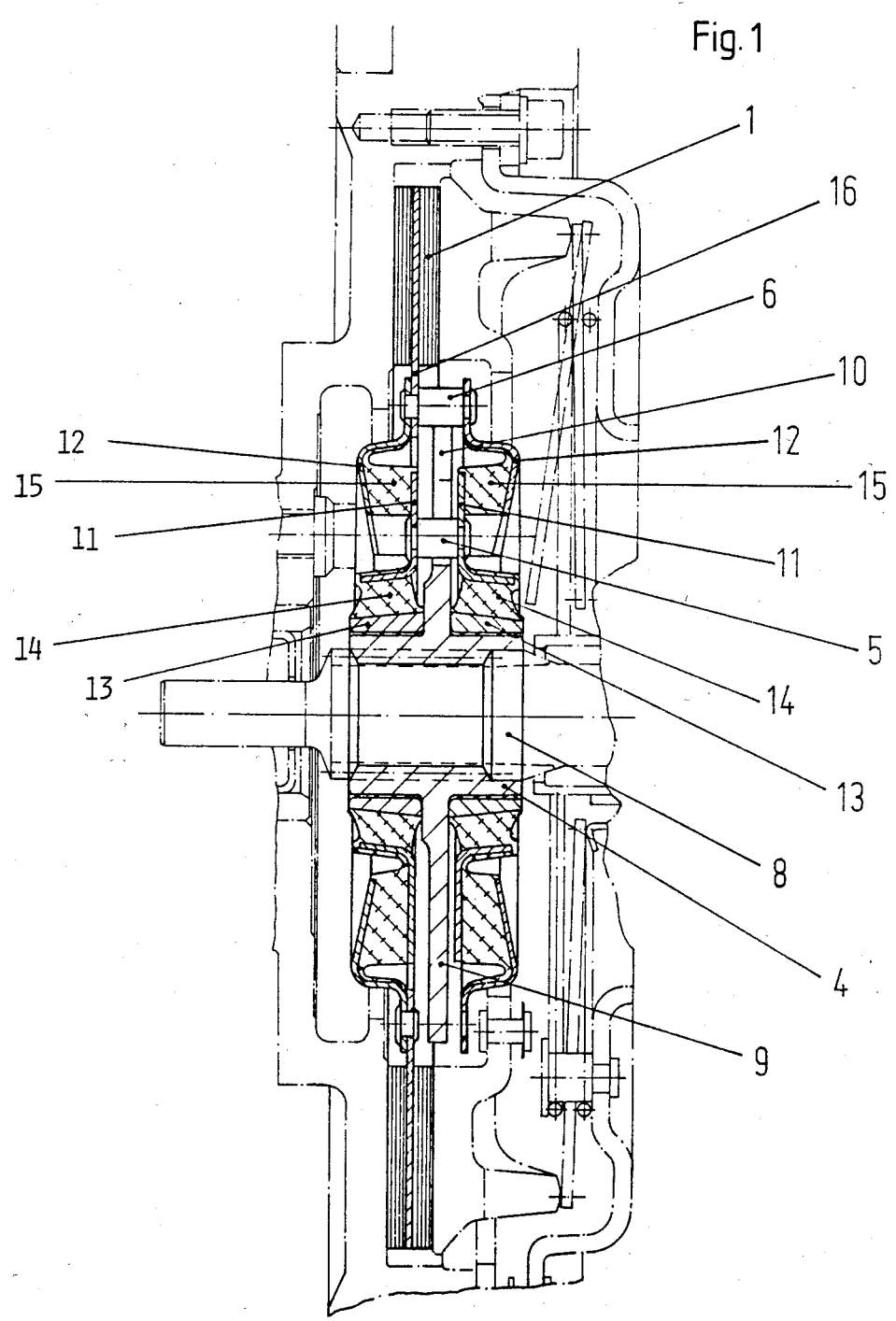
FIG. 1 shows a cross sectional view of an assembled clutch disc to this invention.

FIG. 1 shows a clutch disc that has a hub 4 mounted on an engine shaft 8 and connected to the latter by splines that allow movement of the disc in the longitudinal direction, but secure it against rotation on the shaft. The hub has, in its plane of symmetry, a drive disc 9 that extends radially outwardly and has cutouts of different length in the circumferential direction, depending on the different twist angle limitations. Connections 5 and 6 of intermediate rings 11 and support rings 12 extend through the cutouts, which can be shaped so that they merge into each other radially.

An auxiliary hub 13 consisting of separate parts is anchored on the outer circumference of the hub on both sides of the drive disc 9 to be secured against rotation. Such an anchor connection can be secured to the hub 4 most simply by means of a shrink joint. In order to attach the anchor connection, the hub 4 is cooled down to a very low temperature and is joined in that condition to the auxiliary hub 13. The subsequent temperature equalization will produce a firm fit of the hubs 4 and 13 on each other.

Inner damper rings 14 are adhesively fastened to the outer circumference of the auxiliary hub preferably by vulcanizing. The inner damper ring is confined in the radially outward direction by a flange that extends substantially in the axial direction from the central part of the intermediate ring 11, to which the damper ring 14 is also joined.

The boundary surfaces of the inner damper rings 14, which lie on top of each other in the radial direction, are parallel to each other and are at an angle to the axis of rotation. An elastic pre-stress of the clutch disc, which has a positive effect on the attainable service life, can be produced in the damper ring 14 by a relative displacement of the intermediate ring parallel to the axis of rotation. Through mutual dimensional matching of the inclination of this angle to the mutual spacing of the auxiliary hubs and the mutual spacing of the intermediate rings, in accordance with the present invention, an optimum pre-stress is obtained in the damper rings 14.

The same principles apply to a pair of outer damper rings 15, which connect the opposing surfaces of the intermediate rings 11 and the support rings 12 and have a V-shaped cross section. The pre-stress obtained is determined in this case primarily by the mutual spacing of the support rings, i.e., by the length of the spacer sleeve in the region of the connection 6.

The connections 5 and 6 consist of rivet joints, connections 5 being arranged in axial cutouts of the support rings 12 and the outer damper ring 15. The intermediate rings 11 and the support rings 12 consist of sheet steel 1.5 mm thick. The connections 6 also extend through friction disc 16, and friction linings 1 are fastened on both sides of the latter disc.

The inner damper rings 14 have a particularly soft spring characteristic, which ensures good isolation of the vibrations introduced by the engine at low torque or when idling. With increasing torque, an increasing degree of deformation of the damper rings 14 is obtained until the sleeve of the rivet connection means 5 comes to rest at the corresponding stop of the drive disc 9. When this condition is reached, the input torque is transmitted, as with a rigid coupling, directly from the engine shaft into the intermediate rings and, through them, into the outer damping elements. Due to the position and configuration of the damping rings 14, they have a substantially steeper spring characteristic, whereby transmission of the nominal torque in the elastic range is achieved. At the same time, good damping of the input vibrations is obtained. When starting or in the event of unforeseen overloads, an extreme deformation of the outer damper rings 15 can occur, until finally, there is contact between each of the connecting bolts 6 and the end stop at the edge of the respective cutout 10 of the drive disc 9. When this condition is reached, a completely rigid connection between the engine shaft 8 and the friction linings 1 is established, whereby damage to the damper rings is made impossible. The proposed clutch disc is thus capable of withstanding even large overloads, and the latter cannot cause changes of the damper rings 14 and 15 that might be detrimental for further operation.

Figure 2:
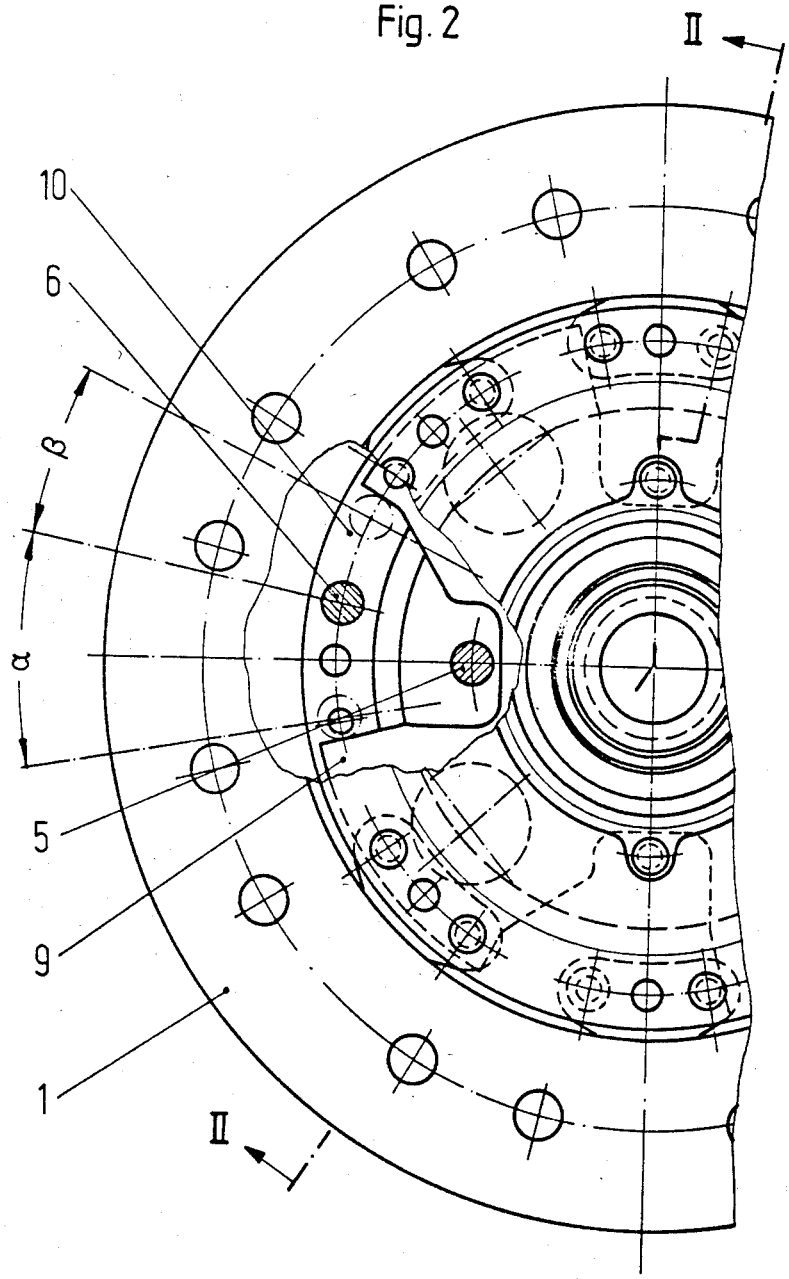
FIG. 2 shows a partially cut-open face view of the clutch disc in FIG. 1.

FIG. 2 shows a partially cut-open view of the clutch disc illustrating the asymmetrical rest position of the connecting bolts 6 relative to the stops of the drive disc 9, as indicated by the angles $\alpha$ and $\beta$. These stops are formed by the edges of cutouts that extend in the radial direction of the drive disc and are located at the same distance from the axis of rotation. As a result, a different resiliency is obtained for one direction of rotation than the other, which has advantages for use in the drive line of a motor vehicle, due to the fact that more resiliency is desired for forward travel than for reverse travel. In addition, with frequent load changes, protection of the damper rings, and, thereby, a longer service life is obtained.

What is claimed is:

1. In a vibration damping clutch disc comprising:
   a hub, having extended outwardly therefrom a drive disc having cutouts therein;
   inner and outer damper rings of elastomeric material one of each disposed on each side of the drive disc, the inner and outer damper rings being concentric with each other;
   a friction ring;
   an intermediate ring on each side of said disc;
   support rings on each side of said disc;
   first means connecting said support rings to each other with a spacing and to said friction ring; and
   said first means and means associated with said intermediate rings engaging in the cutouts of the drive disc, the cutouts comprising end stops on both sides to limit rotational mobility of the intermediate rings and the support rings relative to the drive disc, the improvement comprising:
   the intermediate rings having angular cross-sections with legs extending radially outwardly;

second means rigidly connecting said legs of the intermediate rings to each other with a spacing said second means being the means associated with said intermediate rings engaging in the cutouts; and the support rings including portions extending substantially radially inwardly and axially outwardly spaced from said legs, the outer damping rings being located between said outwardly extending legs of said intermediate rings and the inwardly extending portions of said support rings.

2. A vibration-damping clutch disc according to claim 1 in which the connection means between the intermediate rings comprises bolts uniformly distributed around the circumference.

* * * * *